US008835037B2

(12) United States Patent
Nguyen et al.

(10) Patent No.: US 8,835,037 B2
(45) Date of Patent: Sep. 16, 2014

(54) BATTERY CELL CARRIER

(75) Inventors: Hoang Phu Nguyen, Surrey (CA); Johannes Christian Kruger, Coquitlam (CA); Brent Anthony Perry, Surrey (CA); Colm Murphy, Surrey (CA)

(73) Assignee: Corvus Energy Ltd., Richmond, British Columbia (CA)

( * ) Notice: Subject to any disclaimer, the term of this patent is extended or adjusted under 35 U.S.C. 154(b) by 0 days.

(21) Appl. No.: 13/364,085

(22) Filed: Feb. 1, 2012

(65) Prior Publication Data
US 2013/0196195 A1 Aug. 1, 2013

(51) Int. Cl.
*H01M 10/50* (2006.01)
*H01M 2/24* (2006.01)
*H01M 6/12* (2006.01)

(52) U.S. Cl.
USPC ........... 429/120; 429/160; 429/161; 429/162; 429/163

(58) Field of Classification Search
USPC ............ 429/82, 99, 100, 120, 158–163
See application file for complete search history.

(56) References Cited

U.S. PATENT DOCUMENTS

| 2004/0021442 A1 | 2/2004 | Higashino | |
| 2006/0234119 A1* | 10/2006 | Kruger et al. | 429/160 |
| 2008/0090137 A1 | 4/2008 | Buck et al. | |
| 2009/0325059 A1 | 12/2009 | Niedzwiecki et al. | |
| 2010/0247998 A1* | 9/2010 | Hostler et al. | 429/120 |
| 2010/0310909 A1* | 12/2010 | Yun et al. | 429/90 |
| 2011/0293983 A1* | 12/2011 | Oury et al. | 429/120 |
| 2012/0009455 A1* | 1/2012 | Yoon | 429/120 |
| 2012/0021271 A1 | 1/2012 | Tople et al. | |

OTHER PUBLICATIONS

International Search Report and Written Opinion for PCT/CA2012/000102 (Oct. 1, 2012).

* cited by examiner

*Primary Examiner* — Muhammad Siddiquee
(74) *Attorney, Agent, or Firm* — LeClairRyan, a Professional Corporation

(57) ABSTRACT

The present disclosure is directed at a cell carrier, a stack that includes multiple cell carriers, and a method for assembling the stack. The cell carrier has a rigid backing and bus bar supports that are rigidly mounted to the rigid backing The bus bar supports have sockets positioned to receive fasteners for securing bus bars to the bus bar supports. A battery cell that has electrodes in the form of pliable tabs can be secured to the cell carrier by, for example, adhering the cell body to the rigid backing The cell tabs are secured between the bus bars and the bus bar supports when bus bars are fastened to the bus bar supports, and the rigidly mounted supports help prevent relative motion between the cell body and tabs. This helps prevent the cell tabs from ripping or tearing when the battery cell is subjected to vibrations during use.

21 Claims, 11 Drawing Sheets

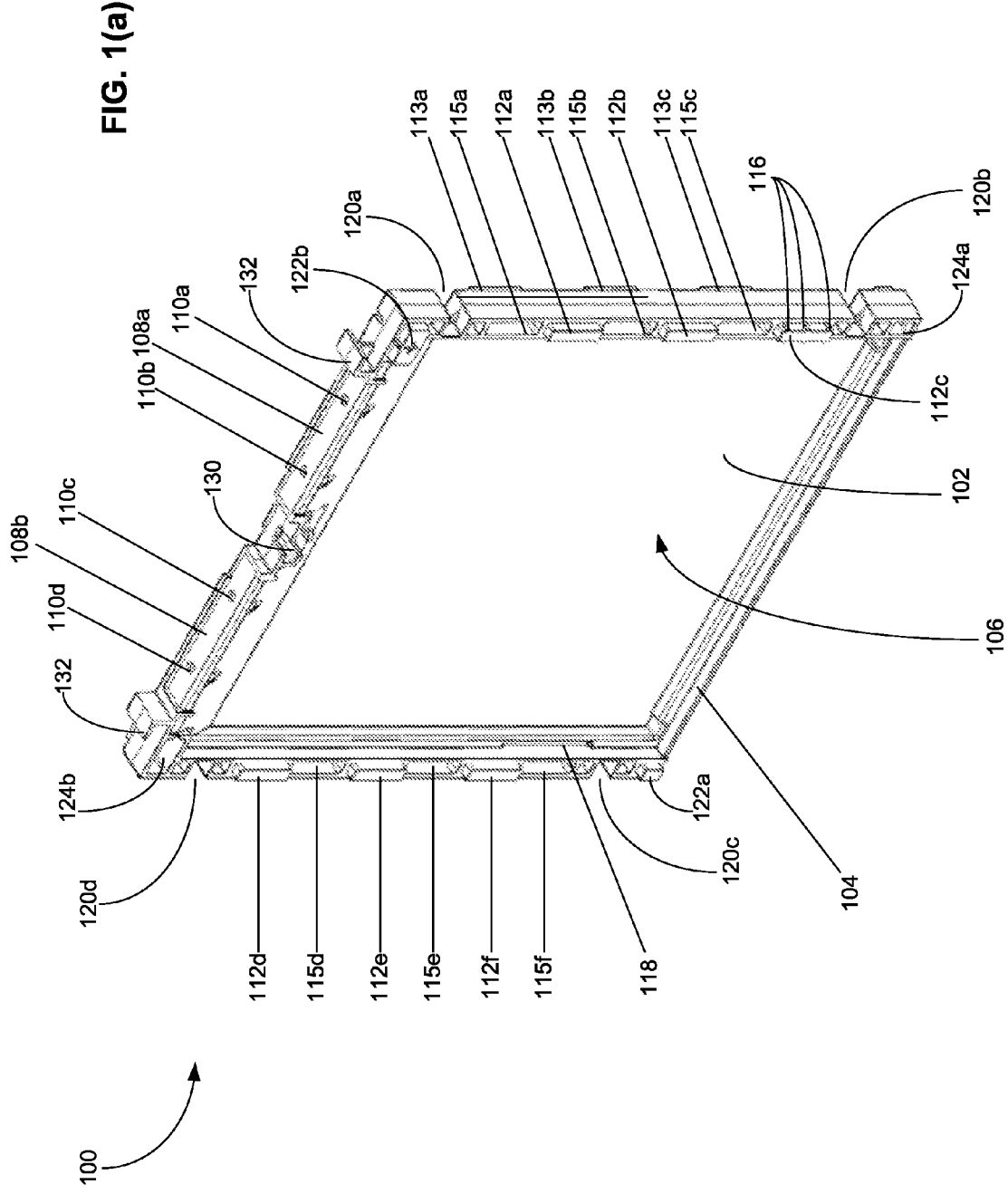

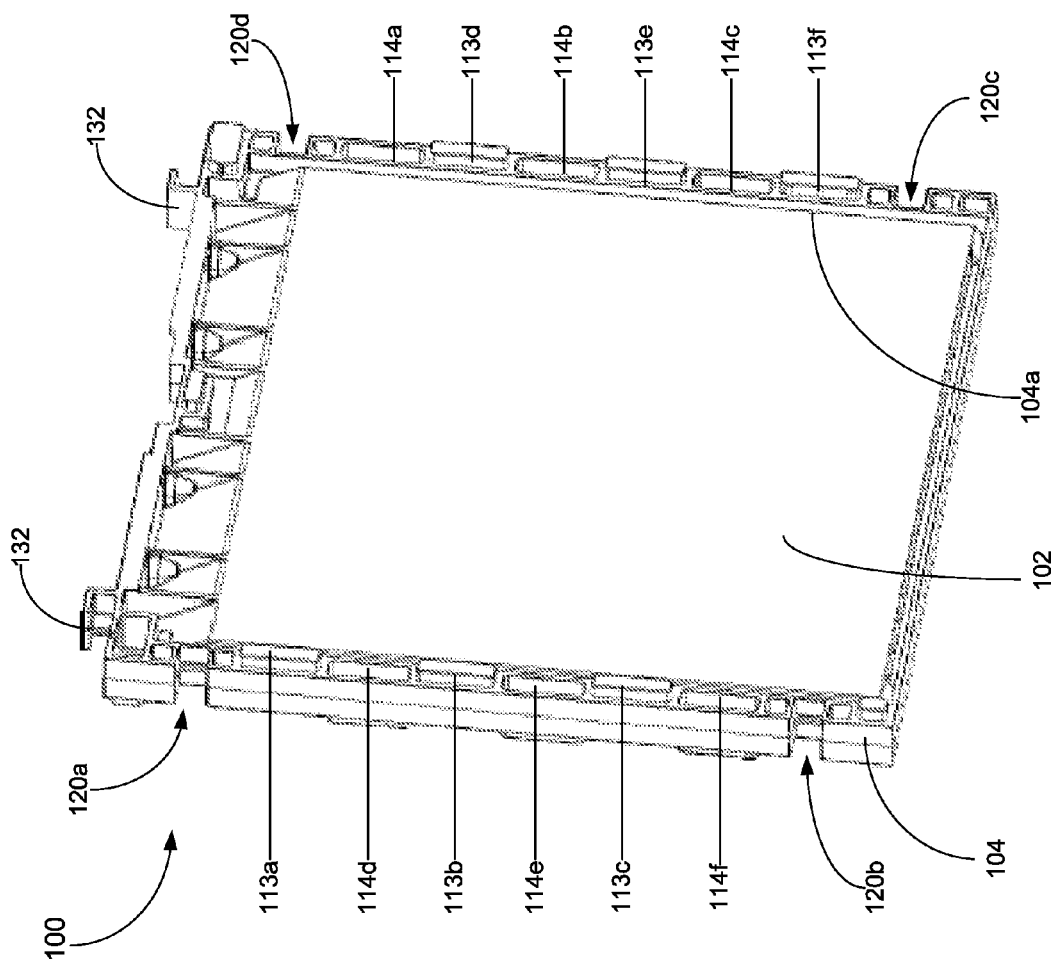

BATTERY CELL CARRIER

FIELD OF THE INVENTION

The present disclosure is directed at a battery cell carrier.

BACKGROUND OF THE INVENTION

The environmental and economic costs of relying on fossil fuels for energy continue to increase. Such costs can be mitigated by, for example, displacing fossil fuels entirely or using fossil fuels more efficiently. Battery packs, such as those assembled using lithium-ion battery cells, can be used in both industrial and consumer settings as an alternative to or in conjunction with fossil fuels as an energy source. Research and development accordingly continues into ways to safely and practically manufacture and use battery packs.

SUMMARY OF THE INVENTION

According to a first aspect, there is provided a cell carrier, which includes a rigid backing; and bus bar supports rigidly mounted to the rigid backing, the bus bar supports having sockets positioned to receive fasteners for securing bus bars to the bar supports.

The cell carrier may also include a raised edge coupled to the rigid backing, the rigid backing and the raised edge delimiting a compartment for receiving a cell. The raised edge may include the bus bar supports.

The raised edge may be coupled continuously along its length to the rigid backing Alternatively, the raised edge may be coupled intermittently along its length to the rigid backing.

The cell carrier may include a vent between the rigid backing and a side of the raised edge that extends parallel to the side of the raised edge.

The cell carrier may also include an alignment guide coupled to the rigid backing, the alignment guide including one of a protrusion and recess on a front side of the carrier against which the cell is to be placed and the other of the protrusion and recess on a rear side of the carrier opposed to the front side, the protrusion and recess matably couplable to each other and positioned such that in a stack including multiple cell carriers the protrusion from one of the cell carriers in the stack is fitted within the recess of an adjacent one of the cell carriers in the stack. The protrusion and recess may be shaped such that an interference fit results when the protrusion is inserted into the recess.

Alternatively, the alignment guide may be to the rigid backing and include a protrusion and a recess ("front side protrusion and recess") on a front side of the carrier against which the cell is to be placed and an additional protrusion and an additional recess ("rear side protrusion and recess") on a rear side of the carrier opposed to the front side, the front side protrusion and recess respectively matably couplable to the rear side recess and protrusion such that in a stack having multiple cell carriers the front and rear side protrusions of one of the cell carriers in the stack are respectively fitted within the rear and front side recesses of an adjacent one of the cell carriers in the stack.

The protrusions and recesses may be shaped such that an interference fit results when the front side protrusion is inserted into the rear side recess and when the rear side protrusion is inserted into the front side recess.

At least one of the recesses and protrusions may include ridges positioned to enhance the interference fit.

The front and rear side protrusions and recesses may be part of the raised edge.

The cell carrier may also include a slot positioned to allow the raised edge to flex into the slot when the front side protrusion and recess are respectively matably coupled to the rear side recess and protrusion of the adjacent one of the cell carriers in the stack.

The front side protrusion and rear side protrusion may each include a series of spaced protrusions, and the front side recess and the rear side recess may each include a series of spaced recesses.

The alignment guide may also include an orientation guide having orientation protrusions and orientation recesses positioned to allow one of the cell carriers in the stack to be fitted to the adjacent one of the cell carriers in the stack in only one orientation.

The orientation protrusions may include a pair of front side orientation protrusions located on diagonally opposed corners of the front side and a pair of rear side orientation protrusions located on diagonally opposed corners of the rear side, and the orientation recesses may include a pair of front side orientation recesses located on diagonally opposed corners of the front side and a pair of rear side orientation recesses located on diagonally opposed corners of the rear side.

The cell carrier may also include a dowel hole positioned such that in a stack including multiple cell carriers the dowel holes of the cell carriers in the stack align to form a dowel channel extending through the stack.

According to another aspect, there is provided a stack including battery cells including tabs; and multiple cell carriers attached together. Each of the cell carriers includes a rigid backing to which one of the battery cells is adhered; bus bar supports rigidly mounted to the rigid backing, the bus bar supports having sockets positioned to receive fasteners for securing bus bars to the bar supports; and an alignment guide coupled to the rigid backing, the alignment guide including one of a protrusion and recess on a front side of the carrier against which the cell is to be placed and the other of the protrusion and recess on a rear side of the carrier opposed to the front side, the protrusion and recess matably couplable to each other and positioned such that in a stack including multiple cell carriers the protrusion from one of the cell carriers in the stack forms an interference fit with the recess of an adjacent one of the cell carriers in the stack.

The stack may also include one or more heat conductive sheets, each of which contacts one of the cells and has a portion contained within the stack that is coplanar with the rigid backing of the compartment in which the one of the cells is located, and each of which may extend out of the stack.

At least one of the cell carriers may also include a vent between the rigid backing and a side of the raised edge that extends parallel to the side of the raised edge, and at least one of the heat conductive sheets may extend out through the vent.

At least one of the cells may be contacted on one side by one of the heat conductive sheets and may be contacted on an opposing side by another of the heat conductive sheets.

Each of the cell carriers may also include a dowel hole positioned such that the dowel holes align to form a dowel channel extending through the stack when the stack is assembled, and the stack may also include a dowel extending through the dowel channel and a clamp located at the end of the dowel that secures the cell carriers together.

According to another aspect, there is provided a method for assembling a stack, which includes assembling multiple cell carrier assemblies, aligning the cell carrier assemblies together; inserting a dowel through a dowel channel of the stack; and securing the stack in place by clamping the stack along the dowel. Each of the cell carrier assemblies includes a battery cell having tabs; and a cell carrier, which includes: (1) a rigid backing to which the cell is adhered; (2) bus bar supports rigidly mounted to the rigid backing, the bus bar supports having sockets positioned to receive fasteners for securing bus bars to the bar supports; and (3) an alignment guide coupled to the rigid backing, the alignment guide having one of a protrusion or recess on a front side of the carrier against which the cell is to be placed and the other of the protrusion or recess on a rear side of the carrier opposed to the front side, the protrusion and recess matably couplable to each other and positioned such that in the stack having multiple cell carriers the protrusion from one of the cell carriers in the stack forms an interference fit with the recess of an adjacent one of the cell carriers in the stack; and (4) a dowel hole positioned such that the dowel holes of the cell carriers in the stack align to form a dowel channel extending through the stack.

Assembling each of the cell carrier assemblies may also include laying a heat conductive sheet against the cell, and the heat conductive sheet may extend out of the stack when the stack is assembled.

BRIEF DESCRIPTION OF THE DRAWINGS

In the accompanying drawings, which illustrate one or more exemplary embodiments:

FIGS. 1(a) and (b) are perspective views of a cell carrier, according to one embodiment.

DETAILED DESCRIPTION OF THE INVENTION

Directional terms such as "top", "bottom", "left", "right", "front", and "rear" are used in the following description for the purpose of providing relative reference only, and are not intended to suggest any limitations on how any article is to be positioned during use, or to be mounted in an assembly or relative to an environment.

During assembly of a typical battery pack, multiple battery cells are physically fixed in relation to each other. A relatively common conventional way this is accomplished is by placing the cells in an epoxy, which is cured and which then rigidly holds the cells. However, several disadvantages are associated with using epoxy. Using epoxy is time consuming as curing can take several hours. Additionally, to prevent contamination by dust and dirt, a relatively sterile room is often used when positioning the cells in the epoxy and during curing. Epoxy also gives off noxious fumes, which can be harmful to humans. Furthermore, should any one of the cells in the battery pack become damaged after the epoxy has cured, it is difficult to remove and repair only the damaged cell without disrupting the other cells in the battery pack.

The embodiments described herein are directed at a carrier for a battery cell. The carrier includes a compartment into which the cell can be placed, which protects the cell from impact and vibration that could impair the cell's performance. The carrier is also modular in that it can be matably coupled to other carriers to form a stack of cells.

Figure 2:
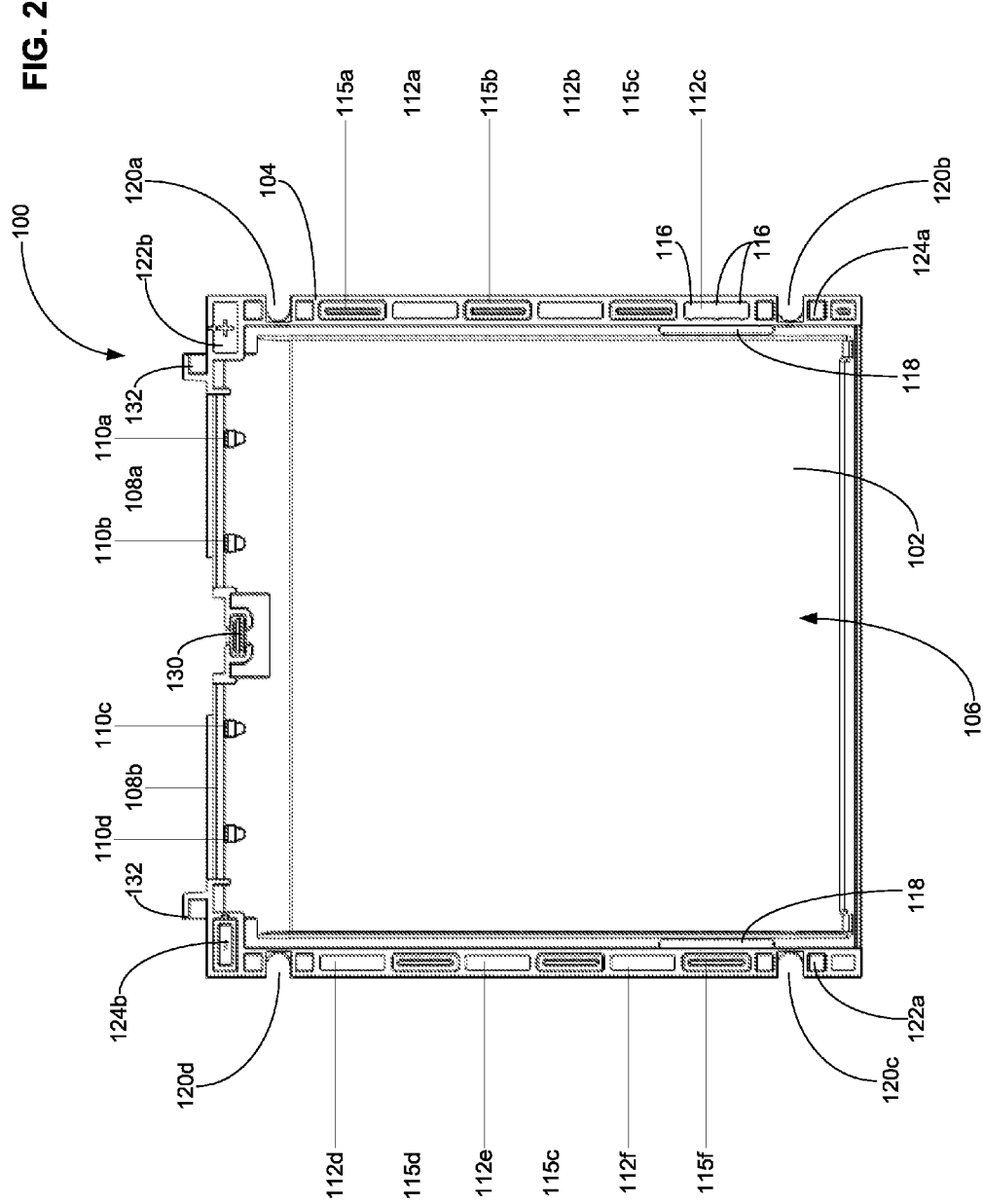
FIG. 2 is a front elevation view of the cell carrier of FIG. 1(a).
Figure 3:
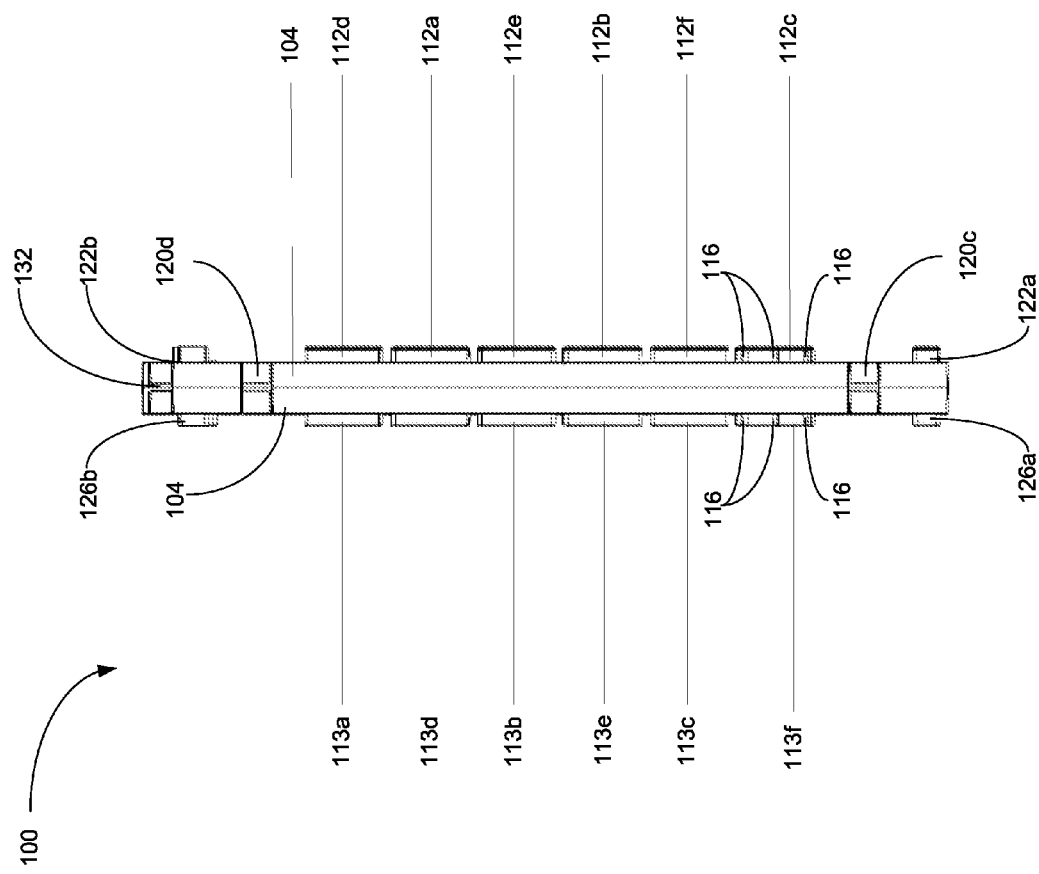
FIG. 3 is a left side elevation view of the cell carrier of FIG. 1(a).
Figure 4:
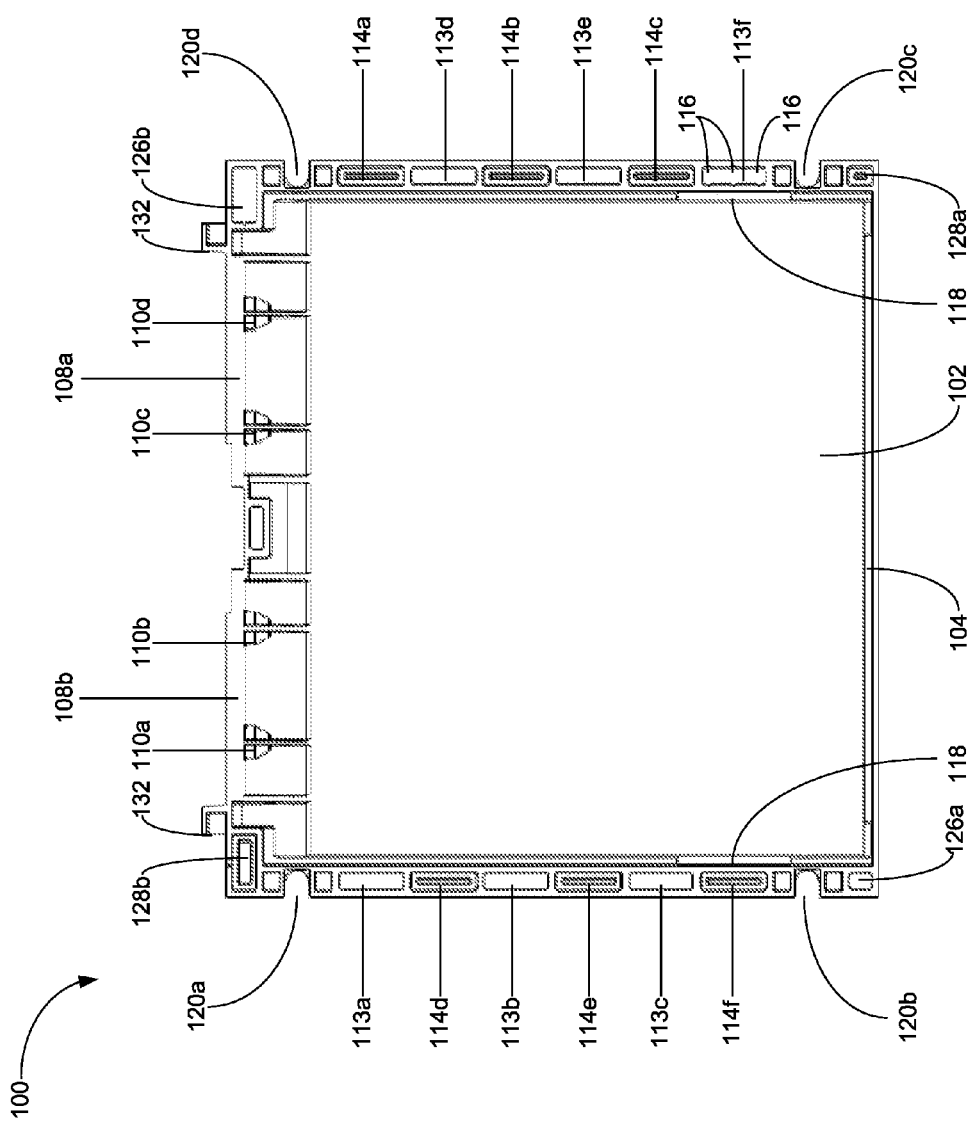
FIG. 4 is a rear elevation view of the cell carrier of FIG. 1(a).
Figure 5:
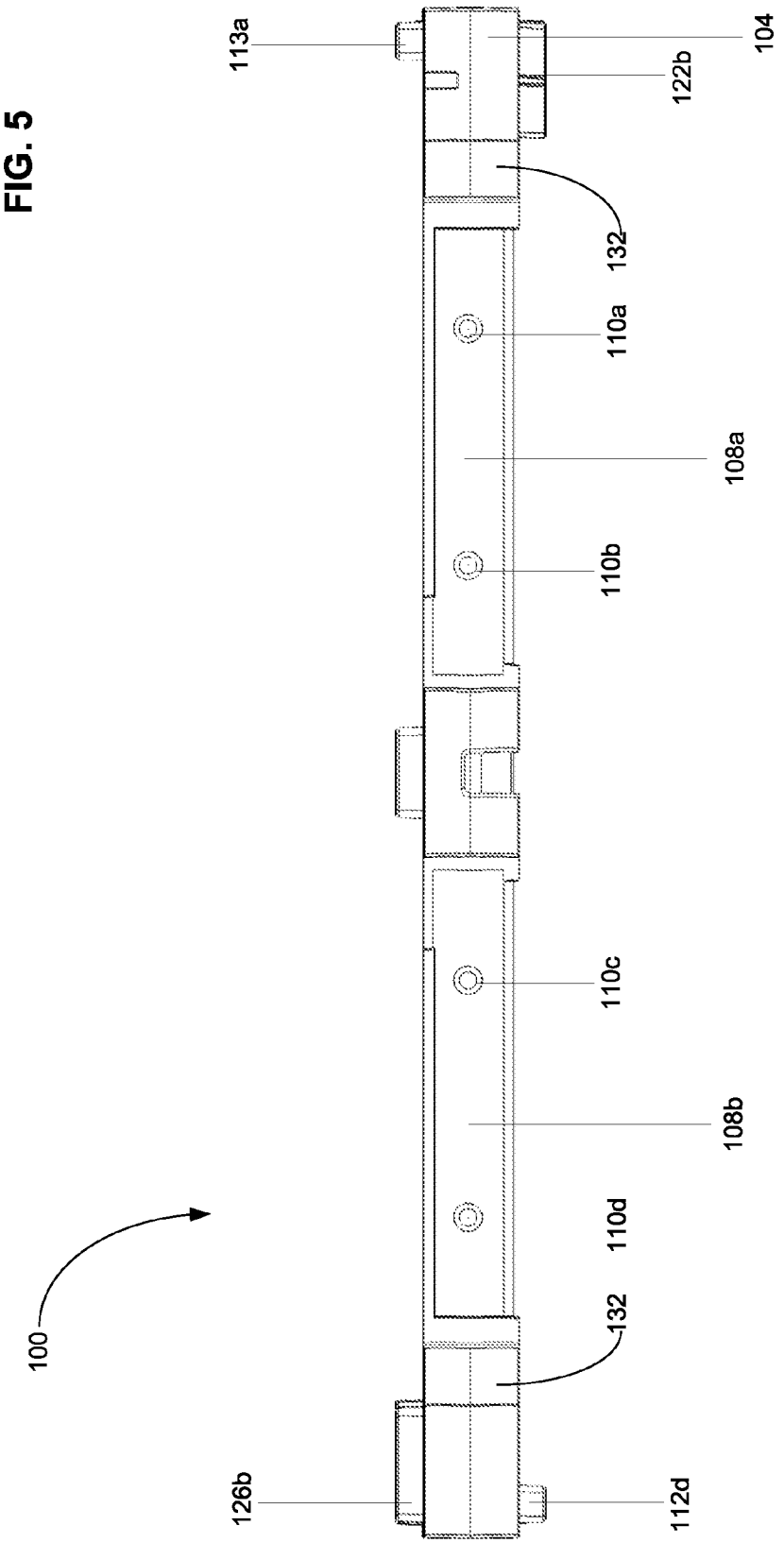
FIG. 5 is a top plan view of the cell carrier of FIG. 1(a).
Figure 6:
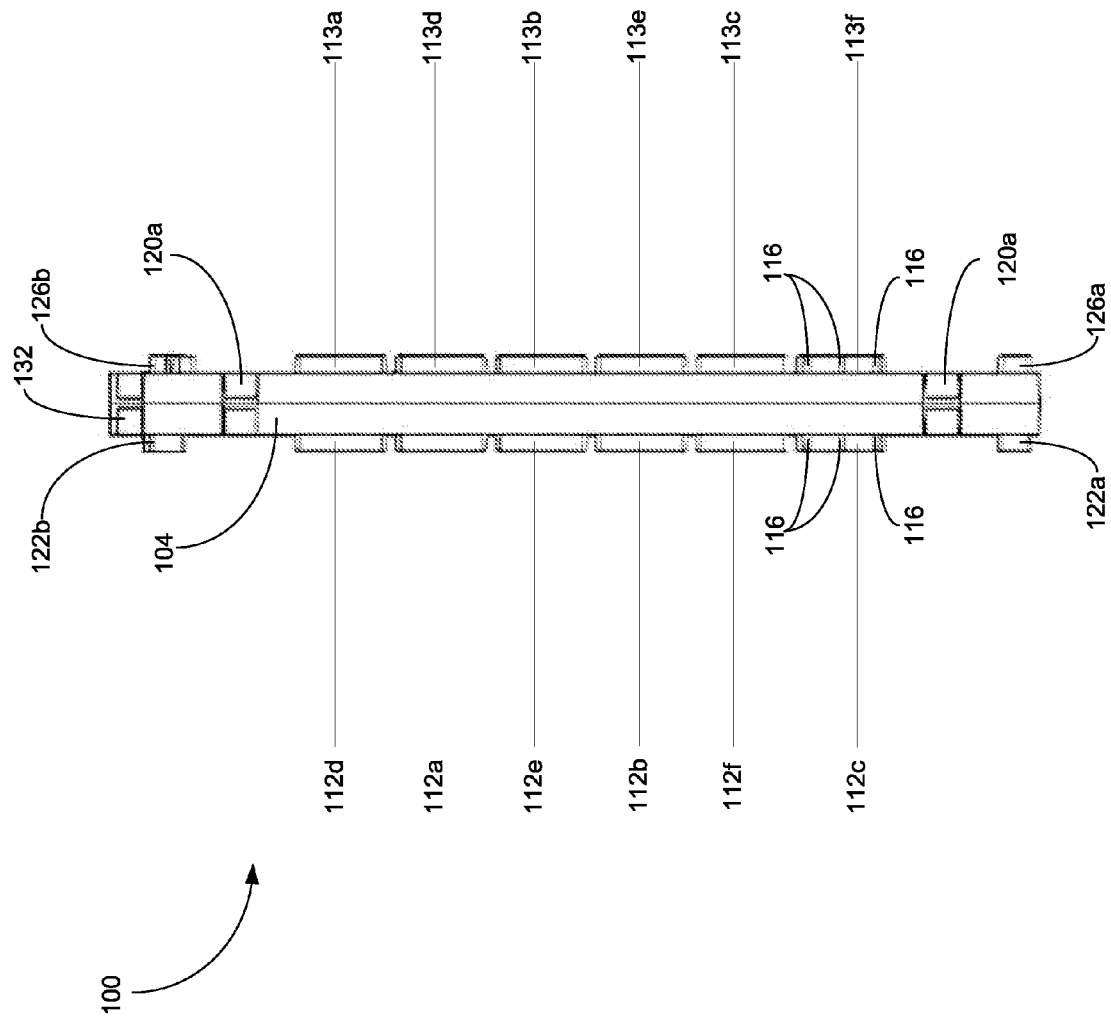
FIG. 6 is a right side elevation view of the cell carrier of FIG. 1(a).
Figure 7:
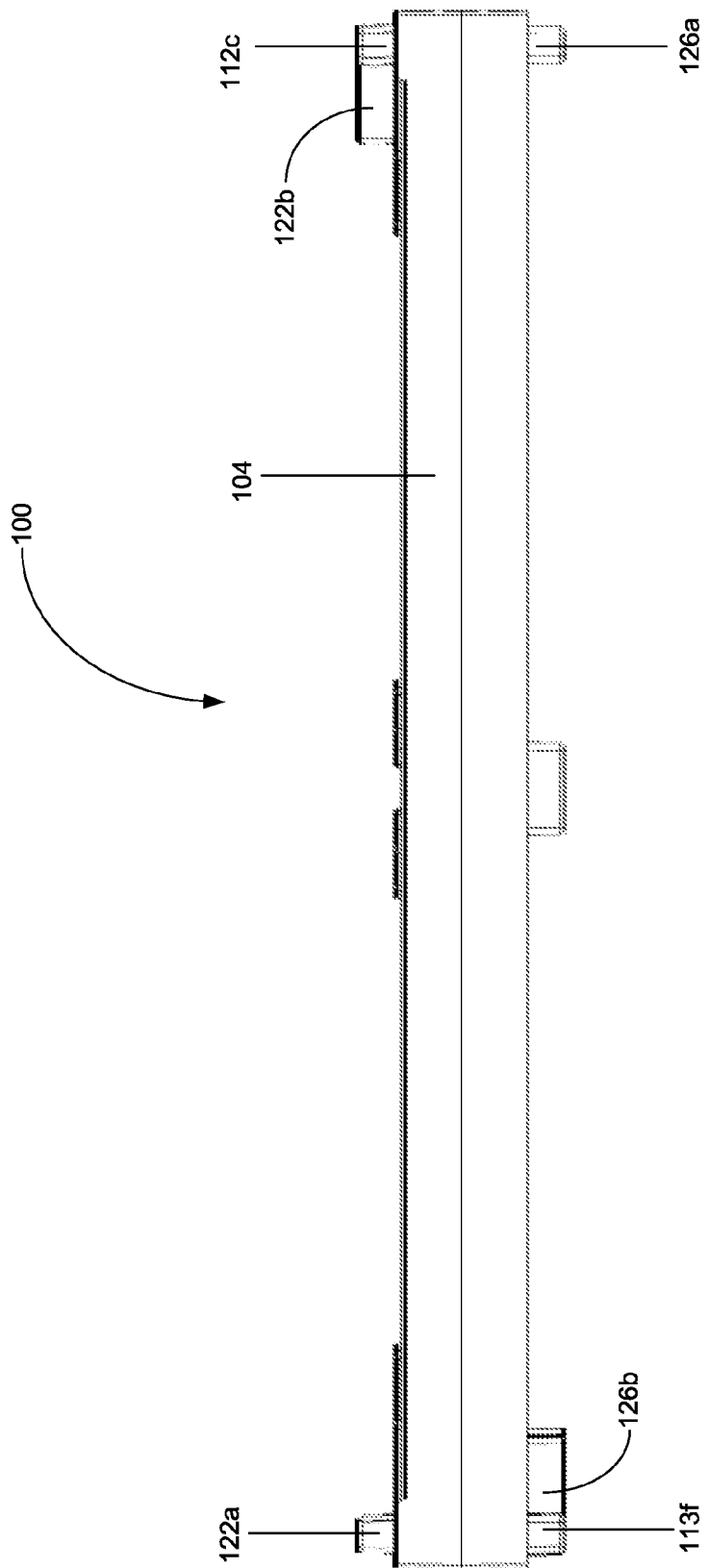
FIG. 7 is a bottom plan view of the cell carrier of FIG. 1(a).

Referring now to FIGS. 1 to 7, there is shown a cell carrier 100 according to one embodiment. FIGS. 1(a) and (b) show perspective views of the cell carrier 100; FIGS. 2 and 4 respectively show front and rear elevation views of the cell carrier 100; FIGS. 3 and 6 respectively show left and right side elevation views of the cell carrier 100; and FIGS. 5 and 7 respectively show top and bottom plan views of the cell carrier 100. The cell carrier 100 includes a rigid backing 102. Lining the periphery of the rigid backing 102 is a raised edge 104; the portion of the raised edge 104 on the front side of the rigid backing 102 and the rigid backing 102 itself collectively delimit a compartment 106 into which a cell 802 (not shown in FIGS. 1 through 7, but shown in FIGS. 8 and 9) is placed during battery pack assembly. As discussed below with respect to FIGS. 8 to 10, the cell 802 is typically placed in the compartment 106 and then adhered to the front side of the rigid backing 102 so as to limit movement of the cell 802 within the compartment 106 during battery pack usage.

The top side of the raised edge 104 includes a pair of bus bar supports 108a,b (collectively, "bar supports 108") against which the cell 802's positive and negative electrodes, which take the form of tabs 804a,b (collectively "tabs 804", not shown in FIGS. 1 through 7, but shown in FIG. 8), are pressed and secured during battery pack assembly. The bar supports 108 include sockets 110a-d (collectively, "sockets 110") into which fasteners (not shown) can be inserted to secure bus bars (not shown) and the tabs 804, as discussed in more detail below.

When in use, the cell 802's positive electrode is placed on one of the bar supports 108a, while the cell 802's negative electrode is placed on the other of the bar supports 108b. In the depicted carrier 100, the tops of the bar supports 108 and the interiors of the sockets 110 are lined with metal as opposed to being made only of plastic, which is what is used to make the remainder of the carrier 100; the bar supports 108 include metal to prevent plastic creep from altering the shape of the bar supports 108 over the carrier 100's lifetime. Typically, when the carrier 100 is used in a battery pack, the bus bars are laid flat over the bar supports 108 and fasteners (not shown) are inserted through the bus bars, through the cell tabs 804 and into the sockets 110 of the bar supports 108. The tabs 804 are pressed between the bus bars and the bar supports 108. The bus bars are used to conduct current from the cells 802, via the tabs 804, to an electrical load (not shown). Having the bar supports 108 begin flat and remain flat over the carrier 100's lifetime, and having the bus bars secured in place against the tabs of the cell 802 and the bar supports 108 by the fasteners, can be beneficial in order to have the area of contact between the bus bars and the tabs remain relatively high over the carrier 100's lifetime.

Because bus bars are placed on the bar supports 108 and electrically connect multiple cell carriers 100 together, it is also beneficial to have the bar supports 108 be coplanar. To help the bar supports 108 conform to relatively tight measurement specifications, a datum 130 relative to which measurements of the carrier 100 are made during its injection molding is positioned near the bar supports 108. In the depicted embodiment, the datum 130 is located equidistant between the bar supports 108, along the top side of the raised edge 104.

Spaced along the left and right sides of the raised edge 104, and extending away from the carrier 100 normal to the front side of the rigid backing 102, are a number of protrusions 112a-f (collectively, "front side protrusions 112") and recesses 115a-f (collectively, "front side recesses 115"). Positioned along the left and right edges of the rear side of the rigid backing 102, and extending away from the carrier 100 normal to the rear side of the rigid backing 102, are additional protrusions 113a-f (collectively, "rear side protrusions 113") and recesses 114a-f (collectively, "rear side recesses 114"). In the depicted embodiment, the front and rear side protrusions 112,114 are identically shaped, and the front and rear side recesses 115,114 are identically shaped. The recesses 115, 114 and protrusions 112,113 are also shaped so that they are matably couplable with each other; i.e., so that any one of the protrusions 112,113 is shaped to snugly fit within, and form an interference fit with, any one of the recesses 115,114. The recesses 115,114 and protrusions 112,113 are complementarily positioned to each other in that when two of the carriers 100 are aligned front side-to-rear side and are pushed into each other, each of the rear side recesses 114 of the frontmost of the two carriers 100 receives one of the front side protrusions 112 of the other of the carriers 100, and each of the rear side protrusions 113 of the frontmost of the two carriers 100 is inserted into one of the front side recesses 115 of the other of the carriers 100. If the two carriers 100 and consequently the protrusions 112,113 and recesses 115,114 are not aligned with each other, the two carriers 100 will not fit together snugly.

One of the front side protrusions 112c and one of the rear side protrusions 113f each has spaced along its sides six ridges 116 that are positioned to contact the sides of the recesses 115f,114f when these two protrusions 112c,113f are inserted into the recesses 115f,114f. This contact enhances the interference fit between these particular pairs of protrusions 112c,113f and recesses 115f,114f, helping to increase the stability of a stack 900 (not shown in FIGS. 1 to 8, but shown in FIG. 9) of the cell carriers 100. Because the ridges 116 increase the pressure that the protrusions 112c,113f apply to the interior of the recesses 115f,114f, the recesses 115f,114f flex and elastically deform when the protrusions 112c,113f are within them. To accommodate this deformation, a pair of slots 118, extending parallel and positioned adjacent to the protrusions 112c,113f, and that pass through the raised edge 104 and rigid backing 102, are present. The slots 118 have a length of about 1.5 times the length of the protrusions 112c, 113f, and are positioned so that the midpoints of the two slots 118 and the midpoints of the protrusions 112c,113f are all collinear.

The corners on the front and rear sides of the carrier 100 also include diagonally opposed orientation protrusions and orientation recesses: front side orientation protrusions 122a, b; rear side orientation protrusions 126a,b; front side orientation recesses 124a,b; and rear side orientation recesses 128a,b (collectively, the front and rear side orientation protrusions are "orientation protrusions 122,126" and the front and rear side orientation recesses are "orientation recesses 124,128"). The front side orientation protrusions 122a,b are positioned at the bottom left and top right corners of the carrier 100 along the raised edge 104, while the front side orientation recesses 124a,b are positioned at the bottom right and top left corners of the carrier 100 along the raised edge 104. The rear side orientation protrusions 126a,b are similarly located at the bottom left and top right corners of the carrier 100, while the rear side orientation recesses 128a,b are located at the bottom right and top left corners of the carrier 100. The orientation protrusions 122b,126b and recesses 124b,128b that are positioned in the top corners of the carrier 100 are shaped to be matably couplable with each other, while the orientation protrusions 122a,126a and recesses 124a, 128a that are positioned in the bottom corners of the carrier 100 are shaped to be matably couplable with each other. The orientation protrusions 122b,126b and recesses 124b,128b that are positioned in the top corners of the carrier 100 are larger than, and are consequently not matably couplable with, those in the bottom corners of the carrier 100.

That the orientation protrusions 122,126 and orientation recesses 124,128 are diagonally opposed to each other ensures that someone assembling the stack 900 of multiple cell carriers 100 is only able to attach the rear side of one of the cell carriers 100 to the front side of an adjacent one of the cell carriers 100. The fact that the orientation protrusions 122b,126b and the recesses 124b,128b in the top corners of the carrier 100 are larger than those in the bottom corners also prevents someone from attaching one carrier 100 upside down relative to another carrier 100. In the depicted embodiment, the orientation protrusions 122,126 and recesses 124, 128 serve both to facilitate proper orientation of the cell carriers 100 relative to each other, and in aligning the cell carriers 100 with each other. The orientation protrusions 122, 126 and recesses 124,128 accordingly collectively function as an orientation guide that facilitates straightforward assembly of the stack 900, and as part of the alignment guide discussed above.

The cell carrier 100 also includes four dowel holes 120a-d (collectively, "dowel holes 120"), each of which is near a different one of the carrier 100's corners, through which dowels 904 (not shown in FIGS. 1 through 8, but shown in FIG. 9) can be inserted during stack assembly as discussed in more detail below. Two of the dowel holes 120a,d are on opposing sides of the raised edge 104 between the orientation protrusions 122b,126b and recesses 124b,128b in the top corners of the carrier 100 and the protrusions 112d,113a and recesses 115a,114a that demarcate the top of the alignment guide. The remaining dowel holes 120b,c are on opposing sides of the raised edge 104 between the orientation protrusions 122a,126a and recesses 124a,128a in the bottom corners of the carrier 100 and the protrusions 112c,113f and recesses 115f,114f that demarcate the bottom of the alignment guide. When several of the carriers 100 are aligned and used to form the stack 900, the dowel holes 120a-d also align to form four dowel channels 902 (not shown in FIGS. 1 through 8, but shown in FIG. 9) through which the dowels may be inserted, as discussed in more detail below.

On the top side of the raised edge 104 are a pair of hooks 132 that are located adjacent to each of the bar supports 108, between the bar supports 108 and the top corners of the carrier 100. The hooks 132 allow the carrier 100 to be picked up by a lifting device instead of manually. This is beneficial, for example, when lifting the stack 900, as the relatively high number of carriers 100 included in the stack 900 may make the stack 900 too heavy to manually lift. By placing the hooks 132 on the top of the carrier 100, the stack 900 may be lifted into and out of a container in which the stack 900 may be positioned without disturbing the sides of the container.

Figure 8:
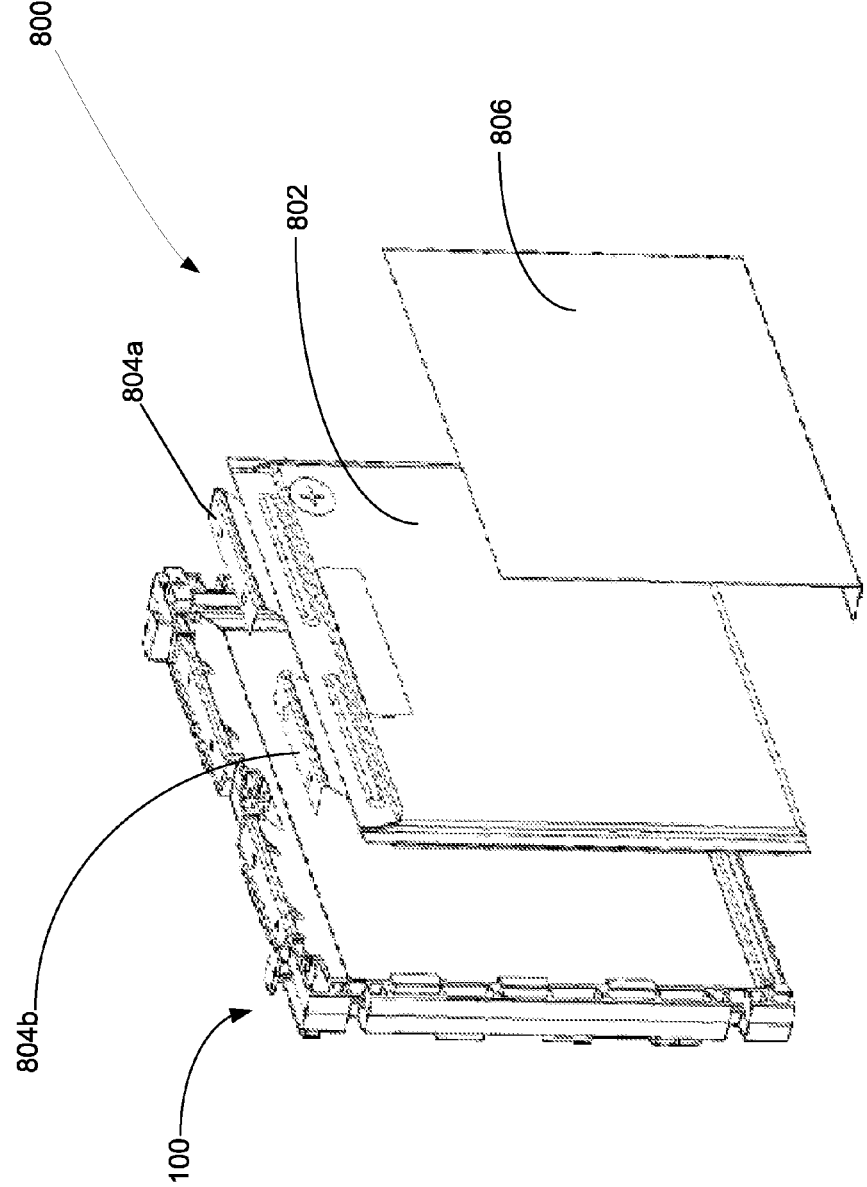
FIG. 8 is an exploded view of a cell carrier assembly, which includes the cell carrier of FIG. 1(a), according to another embodiment.

Referring now to FIG. 8, there is shown an exploded view of a cell carrier assembly 800, according to another embodiment. The cell carrier assembly 800 includes the cell carrier 100 depicted in FIGS. 1 through 7; the cell 802 itself (which may be a 75Ah Lithium Ion cell provided by Dow Kokam™ of Midland, Mich., or any other suitable cell such as a large format prismatic cell or a layered cell); and a heat conductive sheet 806 used to control temperature of the cell carrier assembly 800 during use by conducting heat away from the cell carrier assembly 800 to a heat sink (not shown). The heat conductive sheet 806 may, for example, be a graphite sheet such as the eGraf SpreaderShield™ sheet provided by GrafTech International of Lakewood, OH.

To assemble the cell carrier assembly 800, an adhesive such as 3M's 5572 adhesive, or any other suitable adhesive, is applied to the front side of the cell carrier 100, which is the surface within the compartment 106 against which the cell 802 is placed during use. The cell 802 is then placed within the compartment 106 and laid on the adhesive so that it is secured within the compartment 106. Before applying the adhesive, optionally, double-sided tape may be first applied to hold the cell 802 in place while the adhesive cures. To accommodate thermal expansion, the compartment 106 has dimensions that are approximately 5% deeper than the thickness of the cell 802. The length and width of the compartment 106 correspond to the recommended dimensions supplied by the cell 802 manufacturer. After the cell 802 is secured to the cell carrier 100 the heat conductive sheet 806 is laid on to the exposed surface of the cell 802 and adhered to the cell 802 with a contact adhesive, and the bottom end of the sheet 806 is folded over the bottom of the cell 802 and cell carrier 100 so that it is on the outside of the cell carrier 100. This allows the sheet 806 to cool the cell carrier assembly 800 during use by conducting heat out of the assembly 800. Neither the alignment guide nor the orientation guide utilize an interference fit along the bottom of the cell carrier 100, which allows the sheet 806 to exit out through the bottom of the carrier 100.

Figure 9:
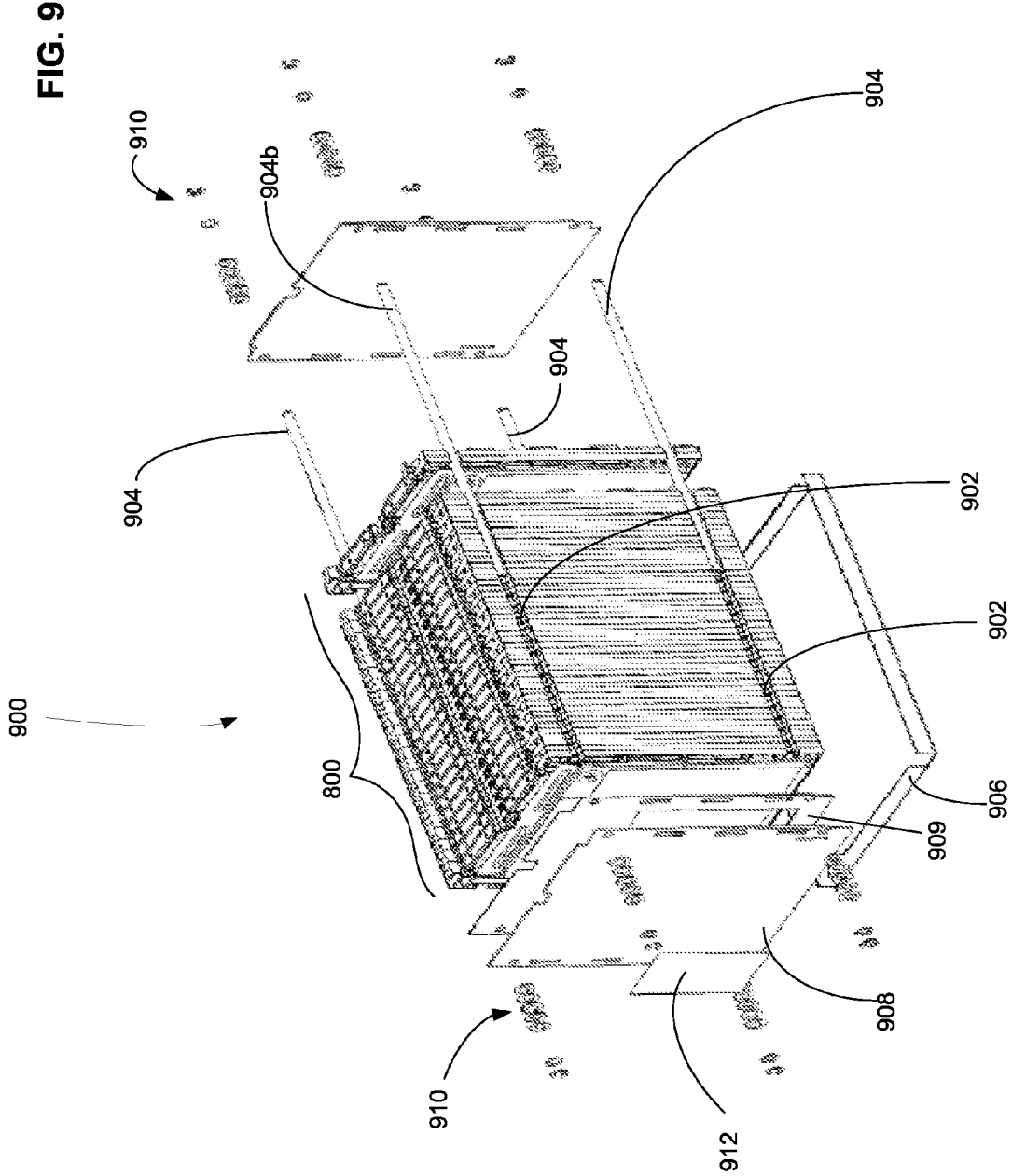
FIG. 9 is an exploded view of a stack having multiple of the cell carrier assemblies of FIG. 8, according to another embodiment.
Figure 10:
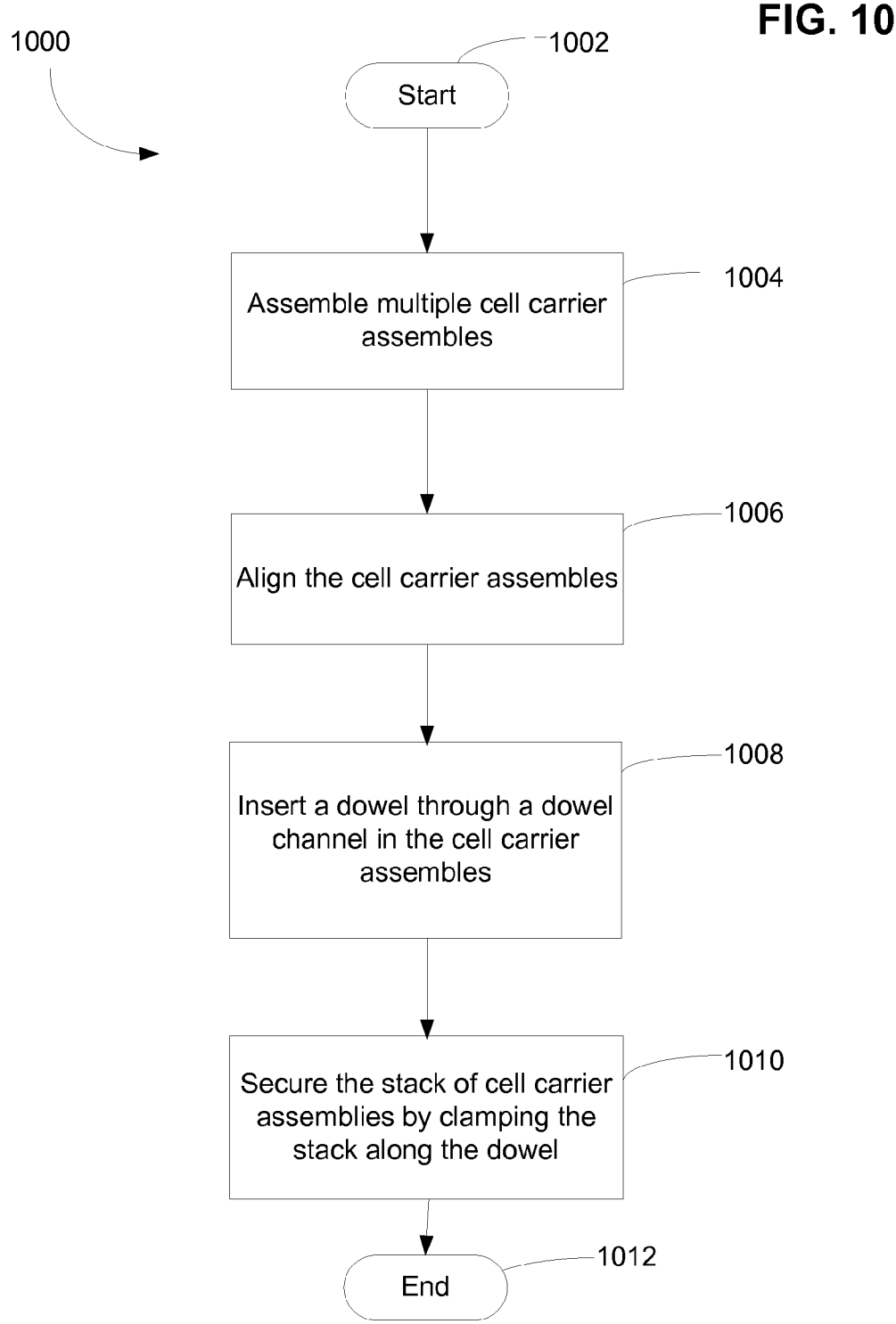
FIG. 10 is method for assembling the stack of FIG. 9, according to another embodiment.

Referring now to FIGS. 9 and 10, there are shown an exploded view of the stack 900, which is assembled from multiple cell carrier assemblies 800, and a method 1000 for assembling the stack 900, according to additional embodiments. The method 1000 begins at block 1002, and proceeds to block 1004 in which multiple cell carrier assemblies 800 are assembled. The cell carrier assemblies 800 may be assembled in accordance with the discussion for FIG. 8, above. Following assembly of the cell carrier assemblies 800, the method 1000 proceeds to block 1006 where the cell carrier assemblies 800 are aligned to form the basis for the stack 900, as shown in FIG. 9. As discussed above, aligning the cell carrier assemblies 800 involves placing the rear side of one of the cell carrier assemblies 800 adjacent the front side of another of the cell carrier assemblies 800 such that the all of the protrusions and recesses on the rear side of the frontmost cell carrier assembly 800 are aligned with their counterparts on the front side of the other cell carrier assembly 800, and then pushing the two cell carrier assemblies 800 together so that the aligned recesses and protrusions become matably coupled with each other. After the cell carrier assemblies 800 have been aligned to form the stack 900, the bus bars are fastened to the bar supports 108, as mentioned above; the fasteners used to secure the bus bars to the bar supports 108 are also inserted through holes in the tabs 802 so that the bus bars press and secure the tabs 802 against the bar supports 108 when the stack 900 is assembled. A suitable type of fastener that can be used is, for example, an M4 bolt; however, any other suitable fastener may be used. The sockets 110 are designed to have ridges that are suitable for injection molding and that prevent the fasteners from being pulled out of the sockets 110 during typical use of the cell carrier assembly 800.

After fastening the bus bars, a spacer plate 909 is aligned with and placed on the frontmost of the cell carrier assemblies 800. The spacer 909 includes an opening sized to receive a portion of the cell 802 that is in the compartment 106 of the frontmost of the carrier assemblies 800, in order to accommodate expansion of this cell 802 should it experience thermal expansion. A portion of the raised edge 104*a* that extends past the rear side of the carrier 100 by around 1 mm creates a cavity on the rear side of each of the carrier assemblies 800 that accommodates the thermal expansion of the other cells 802 used in the stack 900. End plates 908 are placed on the ends of the stack 900 to shield the cell carrier assemblies 800 from the environment. A label 912 identifying the particular stack 900 is placed on one of the end plates 908. Although not shown in FIG. 9, the heat conductive sheet 806 from each of the cell carrier assemblies 800 extends out the bottom of the stack 900, facilitating heat dissipation in any suitable way, such as conduction away from the stack 900. Alignment also results in formation of the four dowel channels 902, and at block 1008 one of the dowels 904 is inserted through each of the dowel channels 902 and through dowel holes (unlabeled) in the end plates 908. Washers 910 are subsequently slipped on to the exposed ends of the dowels 904, and at block 1010 each of the dowels 904 is clamped using clamps (not shown) that are threaded on to the ends of each of the dowels 904. In the depicted embodiment, the washers 910 are Belleville washers, which allow for expansion and contraction of the stack 900, and the clamps used are circlips. In an alternative embodiment, the dowels 904 may be threaded and Nyloc™ nuts may be used as clamps and screwed on to the end of the dowels 904. In alternative embodiments, other suitable clamps may be used. Following securing the stack 900 and curing of the adhesive, the stack 900 is assembled and the method 1000 ends at block 1012. The stack 900 may optionally be laid on to a base plate 906.

Beneficially, adhering the cell 802 to the rigid backing 102, and pressing the tabs 804 securely to the bar supports 108 restrains the motion of the cell 802 during use. Motion of the cell 802 relative to its environment, and relative motion between the cell 802's tabs 804 and the cell 802's square body are both restrained. Reducing movement between the cell 802 and its environment lowers the likelihood that the sides of the cell 802 will impact the sides of the compartment 106, which accordingly reduces the likelihood of a short circuit. Reducing relative movement between the tabs 804 and the body of the cell 802 lowers the likelihood that the tabs 804 will rip or tear off the cell 802's body over time. Fastening the bus bar to tabs 804 of the cell 802 also facilitates consistent conducting of current from the cells 802 through the bus bars.

Using the cell carrier 100 in the stack 900 means that assembling the stack 900 can be done without concern of exposure to noxious fumes, and without requiring a room as free from dust and dirt as is typically used when epoxy is used to secure the cells 802. Assembly can be done relatively quickly because there is no need to wait for any materials to cure, and as discussed above the cells 802 are beneficially held stably and securely in place. Additionally, when any of the cell carrier assemblies 800 is to be repaired, the stack 900 can be partially disassembled by performing the method 1000 in reverse in order to access and then remove from the stack 900 the desired cell carrier assemblies 800. The stack 900 can then be reassembled with the removed cell carrier assemblies 800 absent, or the removed cell carrier assemblies 800 can be replaced so as to maintain the stack 900's output. The cell carrier 100 accordingly facilitates construction of a modular stack.

The cell carrier 100 may be made from any suitable material. For example, the cell carrier 100 may be made primarily of plastic. Valox 357 resin from GE™ Plastics is one exemplary plastic that may be used as it has a suitably high heat deflection temperature (HDT), and is accordingly able to withstand the heat emitted by the cells 802 during operation.

While particular exemplary embodiments are discussed above, other embodiments (not shown) are possible. For example, while the raised edge 104 is used to ensure appropriate spacing between adjacent cell carrier assemblies 800 in the depicted exemplary embodiments, in an alternative embodiment adequate spacing may be ensured in an alternative way. Each of the dowels 904, for example, may have a series of spaced notches extending along its length, with each of the notches shaped to receive one of the cell carriers 100 such that the carrier 100 is prevented from moving along the dowel 904. In this way, even without the raised edge 104, the cell carrier assemblies 800 may be spaced so that the cells 802 have sufficient space to thermally expand. In another alternative embodiment, the alignment guide of the cell carrier 100 may include spacing rods that extend perpendicularly from the rigid backing 102, and whose ends are configured to matably couple with the spacing rods of an adjacent one of the carriers 100.

In a further alternative embodiment, the cell carrier assembly 800 may utilize two or more of the heat conductive sheets 806. For example, the cell 802 may be sandwiched between two of the heat conductive sheets 806, with both of the sheets 806 exiting the compartment 106 through the bottom of the cell carrier 100. Alternatively, one or more of the sheets 806 may exit the compartment 106 through one or more the top, left, and right sides of the cell carrier 100 in addition or alternatively to the bottom of the carrier 100. For example, the carrier 100 may include vents positioned between the rigid backing 102 and the raised edge 104 on the left and right sides of the carrier 100 through which the sheets 806 may exit. These vents may be manufactured by intermittently connecting the raised edge 104 to the rigid backing 102, for example only connecting the raised edge 104 to the corners of the rigid backing 102, as opposed to having the raised edge 104 be continuously coupled to the rigid backing 102 as is shown in the depicted embodiments.

The alignment and orientation guides may also be different in alternative embodiments. For example, the protrusions and recesses may appear on only one of the left and right sides of the rigid backing 102 instead of on both the left and right sides. Alternatively or additionally, the protrusions and recesses may appear along the bottom side of the rigid backing 102. The protrusions and recesses also may not alternate in series along the raised edge 104; for example, the front side of the raised edge may have all protrusions, while the rear side may have all recesses. In another embodiment, the compartment 106 has a rigid cover placed on top of the raised edge 104 to shield what is the exposed side of the cell 802 in the depicted embodiments above. In such an embodiment, the alignment guide may be centrally located on the rigid backing 102 and cover. In another alternative embodiment, the rigid backing 102 extends beyond the raised edge 104.

The embodiments above also have the compartment 106 and the raised edge 104 on the front side of the carrier 100, with the rear side of the carrier 100 being relatively flat. In an alternative embodiment, the carrier 100 may be made thicker such that both the front and rear sides of the carrier include compartments, which allows one carrier 100 to hold two of the cells 802.

While particular embodiments have been described in the forgoing, it is to be understood that other embodiments are possible and are intended to be included herein. It will be clear to any person skilled in the art that modifications of and adjustments to the forgoing embodiments, not shown are possible.

What is claimed:

1. A cell carrier assembly, comprising:
    (a) a battery cell;
    (b) a cell carrier, comprising:
        (i) a rigid backing;
        (ii) a raised edge coupled to the rigid backing, the rigid backing and the raised edge delimiting a compartment in which the battery cell is located; and
        (iii) bus bar supports rigidly mounted to the rigid backing, the bus bar supports having sockets positioned to receive fasteners for securing bus bars to the bar supports; and
    (c) a heat conductive sheet that contacts the battery cell, that has a portion that is coplanar with the rigid backing, and that extends out of the compartment.

2. A cell carrier assembly as claimed in claim 1 wherein the raised edge comprises the bus bar supports.

3. A cell carrier assembly as claimed in claim 1 wherein the raised edge is coupled continuously along its length to the rigid backing.

4. A cell carrier assembly as claimed in claim 1 wherein the raised edge is coupled intermittently along its length to the rigid backing.

5. A cell carrier assembly as claimed in claim 4 further comprising a vent between the rigid backing and the raised edge.

6. A cell carrier assembly as claimed in claim 1 further comprising an alignment guide coupled to the rigid backing, the alignment guide comprising one of a protrusion and recess on a front side of the carrier against which the battery cell is placed and the other of the protrusion and recess on a rear side of the carrier opposed to the front side, the protrusion and recess matably couplable to each other and positioned such that in a stack comprising multiple cell carriers the protrusion from one of the cell carriers in the stack is fitted within the recess of an adjacent one of the cell carriers in the stack, wherein the protrusion and recess are shaped such that an interference fit results when the protrusion is inserted into the recess.

7. A cell carrier assembly as claimed in claim 1 further comprising an alignment guide coupled to the rigid backing, the alignment guide comprising a protrusion and a recess ("front side protrusion and recess") on a front side of the carrier against which the battery cell is placed and an additional protrusion and an additional recess ("rear side protrusion and recess") on a rear side of the carrier opposed to the front side, the front side protrusion and recess respectively matably couplable to the rear side recess and protrusion such that in a stack comprising multiple cell carriers the front and rear side protrusions of one of the cell carriers in the stack are respectively fitted within the rear and front side recesses of an adjacent one of the cell carriers in the stack.

8. A cell carrier assembly as claimed in claim 7 wherein the protrusions and recesses are shaped such that an interference fit results when the front side protrusion is inserted into the rear side recess and when the rear side protrusion is inserted into the front side recess.

9. A cell carrier assembly as claimed in claim 8 wherein at least one of the recesses and protrusions comprises ridges positioned to enhance the interference fit.

10. A cell carrier assembly as claimed in claim 8 wherein the front and rear side protrusions and recesses comprise part of the raised edge.

11. A cell carrier assembly as claimed in claim 10 further comprising a slot positioned to allow the raised edge to flex into the slot when the front side protrusion and recess are respectively matably coupled to the rear side recess and protrusion of the adjacent one of the cell carriers in the stack.

12. A cell carrier assembly as claimed in claim 7 wherein the front side protrusion and rear side protrusion each comprises a series of spaced protrusions, and wherein the front side recess and the rear side recess each comprises a series of spaced recesses.

13. A cell carrier assembly as claimed in claim 6 wherein the alignment guide further comprises an orientation guide comprising orientation protrusions and orientation recesses positioned to allow one of the cell carriers in the stack to be fitted to the adjacent one of the cell carriers in the stack in only one orientation.

14. A cell carrier assembly as claimed in claim 13 wherein the orientation protrusions comprise a pair of front side orientation protrusions located on diagonally opposed corners of the front side and a pair of rear side orientation protrusions located on diagonally opposed corners of the rear side, and wherein the orientation recesses comprise a pair of front side orientation recesses located on diagonally opposed corners of the front side and a pair of rear side orientation recesses located on diagonally opposed corners of the rear side.

15. A cell carrier assembly as claimed in claim 1 further comprising a dowel hole positioned such that in a stack comprising multiple cell carriers the dowel holes of the cell carriers in the stack align to form a dowel channel extending through the stack.

16. A stack comprising cell carrier assemblies attached together, each of the cell carrier assemblies comprising:
(a) a battery cell comprising tabs;
(b) a cell carrier, comprising:
　(i) a rigid backing to which the battery cell is adhered;
　(ii) a raised edge coupled to the rigid backing, the rigid backing and the raised edge delimiting a compartment in which the battery cell is located;
　(iii) bus bar supports rigidly mounted to the rigid backing, the bus bar supports having sockets positioned to receive fasteners for securing bus bars to the bar supports;
　(iv) an alignment guide coupled to the rigid backing, the alignment guide comprising one of a protrusion and recess on a front side of the carrier against which the battery cell is placed and the other of the protrusion and recess on a rear side of the carrier opposed to the front side, the protrusion and recess matably couplable to each other and positioned such that the protrusion from one of the cell carriers in the stack forms an interference fit with the recess of an adjacent one of the cell carriers in the stack; and
(c) a heat conductive sheet that contacts the battery cell, that has a portion that is coplanar with the rigid backing, and that extends out of the compartment.

17. A stack as claimed in claim 16 wherein the cell carrier of at least one of the cell carrier assemblies further comprises a vent between the rigid backing and the raised edge and wherein the heat conductive sheet extends out through the vent.

18. A stack as claimed in claim 16 wherein at least one of the cell carrier assemblies further comprises another heat conductive sheet, the battery cell being contacted on one side by one of the heat conductive sheets and on an opposing side by the other of the heat conductive sheets.

19. A stack as claimed in claim 16 wherein the cell carrier of each of the cell carrier assemblies further comprises a dowel hole positioned such that the dowel holes align to form a dowel channel extending through the stack when the stack is assembled, and wherein the stack further comprises a dowel extending through the dowel channel and a clamp located at the end of the dowel that secures the cell carrier assemblies together.

20. A cell carrier assembly as claimed in claim 1 wherein the battery cell comprises tabs that function as electrodes, and wherein the cell carrier assembly further comprises fasteners inserted through the tabs and the sockets to secure the tabs to the bus bar supports.

21. A stack as claimed in claim 16 wherein the tabs function as electrodes, and wherein each of the cell carrier assemblies further comprises fasteners inserted through the tabs and the sockets to secure the tabs to the bus bar supports.

* * * * *